(12) United States Patent
Rogner et al.

(10) Patent No.: US 7,891,727 B2
(45) Date of Patent: Feb. 22, 2011

(54) CONFIGURATION FOR FASTENING AND/OR PROCESSING OF TWO VEHICLE PARTS

(75) Inventors: Gert Rogner, Remchingen (DE); Andrea Kunz, Weissenburg (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 261 days.

(21) Appl. No.: 11/875,985

(22) Filed: Oct. 22, 2007

(65) Prior Publication Data
US 2008/0100095 A1    May 1, 2008

(30) Foreign Application Priority Data
Oct. 20, 2006    (DE) .................. 10 2006 050 391

(51) Int. Cl.
*B60S 1/04* (2006.01)
(52) U.S. Cl. ..................................... 296/192
(58) Field of Classification Search .............. 296/192, 296/180.2, 180.3, 180.4, 180.5; 293/120
See application file for complete search history.

(56) References Cited

U.S. PATENT DOCUMENTS 4,122,583 A   10/1978   Grittner et al.
6,773,045 B2   8/2004   Grossklaus

FOREIGN PATENT DOCUMENTS

| | | |
|---|---|---|
| DE | 2718170 A1 | 10/1978 |
| DE | G9014254.3 U1 | 12/1990 |
| DE | 4434210 A1 | 3/1996 |
| DE | 19923030 C2 | 11/2000 |
| DE | 10250392 A1 | 5/2004 |
| EP | 0703008 B1 | 3/1996 |
| JP | 63175666 A | 7/1988 |

*Primary Examiner*—Kiran B. Patel

(57) ABSTRACT

A configuration is provided for the handling and/or processing of a vehicle cowling part together with an add-on part. The parts are coordinated with each other prior to the handling and/or processing and temporarily fixed at a distance from each other by a fastening device and then can be handled and/or processed together, and after the handling and/or processing they are fixed onto each other in the final position. For quick and easy temporary fixation and final fixation, in which no additional securing aids are required, it is proposed that the fastening device is configured as a snap connection with a temporary fixation and a final fixation and makes a single piece with the vehicle cowling part and/or the add-on part.

8 Claims, 3 Drawing Sheets

CONFIGURATION FOR FASTENING AND/OR PROCESSING OF TWO VEHICLE PARTS

CROSS-REFERENCE TO RELATED APPLICATION

This application claims the priority, under 35 U.S.C. §119, of German application DE 10 2006 050 391.0, filed Oct. 20, 2006; the prior application is herewith incorporated by reference in its entirety.

BACKGROUND OF THE INVENTION

Field of the Invention

The invention concerns a configuration for the handling and/or processing of a vehicle cowling part together with an add-on part. The parts are coordinated with each other prior to the handling and/or processing and temporarily fixed at a distance from each other by a fastening device and then can be handled and/or processed together, and after the handling and/or processing they are fixed onto each other in the final position.

Structural parts which are assembled together in the final or delivery condition are often handled or processed in separate process steps, even though the process steps are identical, such as painting of part of a vehicle cowling and an add-on part separately from each other. For this, different fixtures, such as painting frames, must be kept on hand. Especially in the painting process it is difficult to have as little as possible color hue differences between structural parts that are painted in separate processes and assembled together in the final condition.

The proprietary documents German patent DE 199 23 030 C2 (corresponding to U.S. Pat. No. 6,513,296), published, non-prosecuted German patent application DE 44 34 210 A1 or published, and Japanese patent JP 63-175666 A describe applications in which bumper shells are painted together with bumper or protection strips, wherein the bumper strips are temporarily fixed (in DE 199 23 030 C2 with separate securing clamps, in DE 44 34 210 A1 with lengthwise holding and detaining elements, and in JP 63-175666 A with insert pegs on the bumper strip and two constriction regions in the axial direction). After the painting process, the temporary fixations are removed or loosened and the bumper strip is placed in the final position and locked there.

European Patent EP 0 703 008 B1 describes a method in which the add-on parts are temporarily fixed with a slight spacing from the cowling part prior to the painting process, disassembled once again after the painting for further processing steps, and then finally placed in the prescribed final fixation during the following assembly process.

The process chain of the finished assembly is more costly and expensive for separate machining and processing. For example, there is necessarily a higher consumption of processing agent (e.g., primer, paint) and a greater requirement for assembly and accessory fixtures. Also, the larger assembly times as compared to handling and processing in the assembled state are often the cost drivers.

BRIEF SUMMARY OF THE INVENTION

It is accordingly an object of the invention to provide a configuration for fastening and/or processing of two vehicle parts which overcomes the above-mentioned disadvantages of the prior art devices of this general type, in which no additional securing aids are required for the temporary fixation and both the temporary and final fixation can be done fast and easy.

With the foregoing and other objects in view there is provided, in accordance with the invention, a configuration for handling and/or processing of a vehicle cowling part together with an add-on part. The configuration contains a fastening device. The parts are coordinated with each other prior to the handling and/or processing and temporarily fixed at a distance from each other by the fastening device and then can be handled and/or processed together. After the handling and/or processing the parts are fixed onto each other in a final fixed position. The fastening device is a snap connection with a temporary fixation and a final fixation and integrated as a single piece with the vehicle cowling part or the add-on part.

Thanks to the fact that the fastening device is configured as a snap connection with a temporary fixation and a final fixation and it makes a single piece with the vehicle cowling part and/or the add-on part, a configuration for the handling and/or processing of a vehicle cowling part together with an add-on part is improved in such a way that no additional parts are required and the temporary and final fixation are done fast and easy.

Thus, the fastening device in the form of a snap connection with a temporary fixation and a final fixation are realized at the add-on part. The fastening elements are configured as a single piece with the add-on part, or the vehicle cowling part. The configuration enables a fast and easy temporary and final fixation of the respective add-on parts, as well as a painting of bumpers and add-on parts in a single process step, without the use of additional securing aids for the temporary fixation.

In a preferred embodiment, the fastening device has enlargements (also known as snap hooks) on one part, which can snap into suitable openings on the other part, and a first detent step for snapping into a temporary fixation and a second detent step for snapping into the final fixation are disposed on the enlargements. A first detent step for temporary fixation of the add-on part and a second detent step for snapping into the final fixation are provided on the snap hooks, i.e., on the top side.

Preferably, ribs are disposed on the underside of the enlargements (or the snap hooks) in the region of the first detent step, against which the enlargement can slide, so that a shoving into the openings on the other part is facilitated and these ribs likewise serve for the fixation in the temporarily fixed condition.

In this way, the snap hook can be easily introduced into the opening on the other part. Thanks to the molded ribs, a bearing surface is created, which fixes the snap hook in its temporarily arrested condition from the lower side. Thus, in addition to the first detent element, the molded ribs also serve the temporary fixation of the add-on part. In order to avoid an unintentional fixation in the final position, an undercut is preferably provided at the opening of the vehicle cowling part, which prevents a simple pushing in of the add-on part. An exact positioning is accomplished by additional side guides at the opening.

In order to achieve a final fixation, beside the second detent elements provided on the add-on part there are disposed matching ribs at the opening of the vehicle cowling part, which only reach under the add-on part in the final locked condition and fix it. The matching ribs are provided on the vehicle cowling part and arranged on either side next to the respective openings for the snap hooks.

Advantageously, the enlargements are disposed on the add-on part and the openings in the vehicle cowling part.

Preferably, the handling and/or processing is painting, with all preceding process steps (e.g., powerwash or activation of the surface).

In another embodiment of the invention, the final fixation is done in several stages. In this way, a matching or an adjustment of the two structural parts to each other can be done when needed during the assembly. If the fastening is done by the described detent steps, then the second detent step is configured with multiple stages.

In one embodiment, the vehicle cowling part is a bumper and the add-on part is an aerodynamical structural part, like a spoiler, a spoiler diaphragm, expanded wheel wells or an aerodynamic wing.

Therefore, in a preferred embodiment the invention is characterized by a temporary fixation of the aerodynamic component on the vehicle cowling part, for example, a bumper. In this temporary fixation, the add-on part is disposed with a distance from the bumper so that a problem-free painting of both parts is possible. During the painting, the two parts move through the painting layout in temporary fixed condition. Afterwards, which can be immediately after the painting or also later on, the aerodynamic component is shoved from the temporary fixation into the final fixation. Both the temporary fixation and the final fixation are achieved by a snap connection via a first and a second detent step. No additional aids or extra parts are needed. A disassembly of the jointly painted parts prior to the final assembly is also not required.

Other features which are considered as characteristic for the invention are set forth in the appended claims.

Although the invention is illustrated and described herein as embodied in a configuration for fastening and/or processing of two vehicle parts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
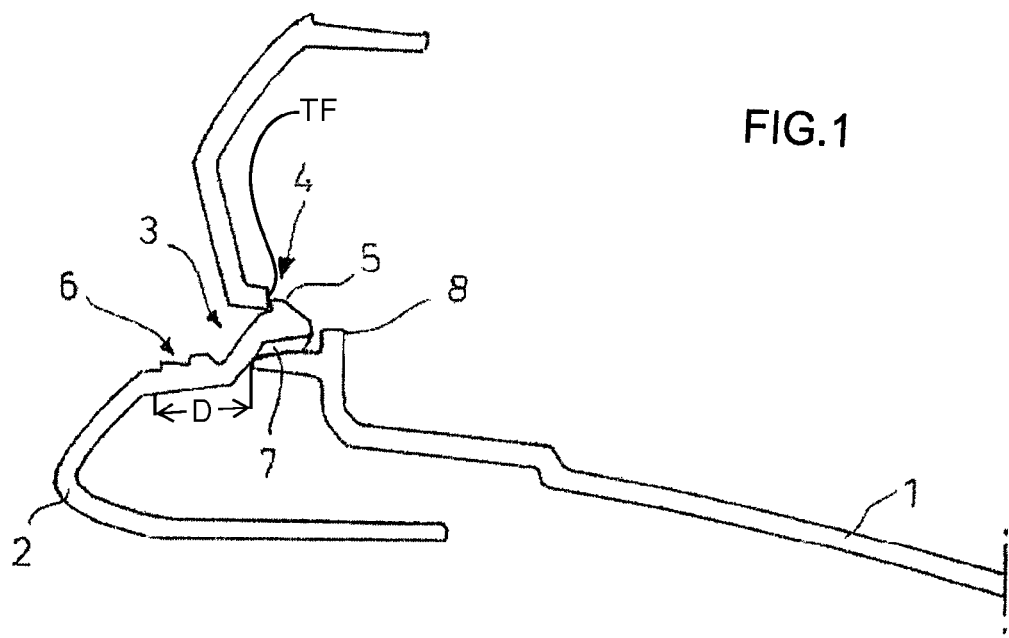
FIG. 1 is a diagrammatic, cross-sectional view of a vehicle cowling part with an add-on part in a temporary fixation position according to the invention.

Referring now to the figures of the drawing in detail and first, particularly, to FIG. 1 thereof, there is shown in a cross section, a vehicle cowling part 1, here, a bumper or its outer skin, and an add-on part 2, here, a spoiler or a spoiler diaphragm, in a temporary fixation, where the add-on part 2 is disposed at a distance from the vehicle cowling part 1. Both parts 1, 2 are painted at the same time in the temporary fixation position. An undercut 8, provided structurally on the vehicle cowling part 1, should ensure that the add-on part 2 is not shoved unintentionally into the final locked state before or during the painting.

The temporary fixation TF, as shown in FIG. 1, is done with a fastening device 3 integrated on the add-on part 2.

The add-on part 2 has the fastening devices 3, which are shoved into corresponding openings 4 on the vehicle cowling part 1. On the fastening device 3, there are disposed a first detent step 5 for snapping into the temporary fixation TF and a second detent step 6 for snapping into the final fixation FF shown in FIG. 2.

Figure 2:
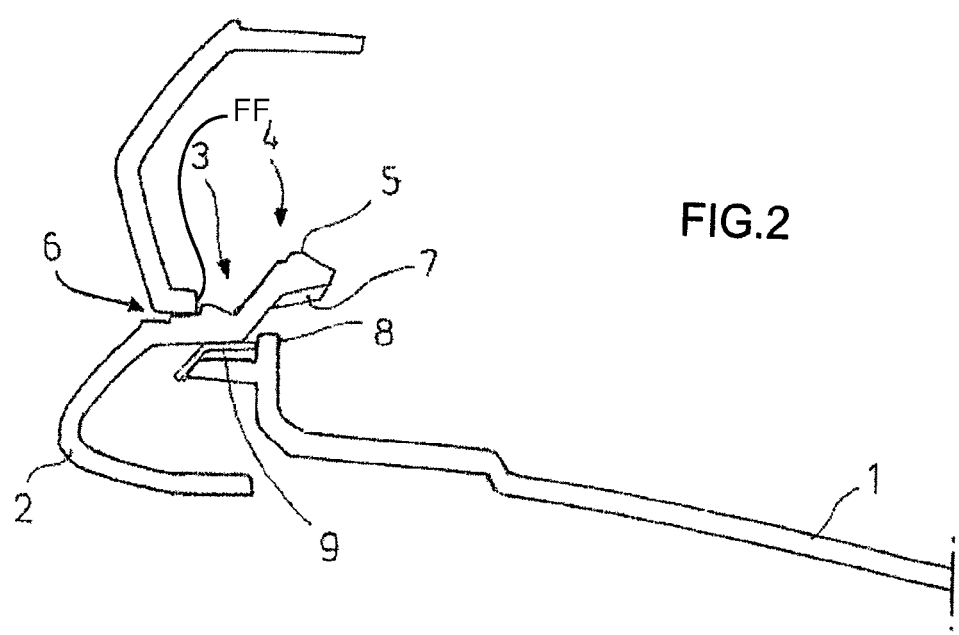
FIG. 2 is a cross-sectional view of the add-on part in a final fixation on the vehicle cowling part.

FIG. 2 shows in the same cross section as FIG. 1 the final fixation position FF of the add-on part 2 on the vehicle cowling part 1. The first detent step 5 on the fastening device 3 has been shoved into the vehicle cowling part 1 and the second detent step 6, as well as matching ribs 9 provided on the vehicle cowling part 1, anchor the add-on part 2 in the final fixation position FF. In order to show the position of the matching ribs 9, these are likewise sketched in FIG. 3. In the final fixation position, the vehicle cowling part 1 can be delivered to the customer or be mounted on the vehicle. FIG. 2 also shows ribs 7 arranged on the underside of the first detent step 5, by which the fastening device 3 of the add-on part 2 can be easily introduced into the opening and which likewise serve to fix the add-on part 2 in the temporary fixed state TF.

Figure 3:
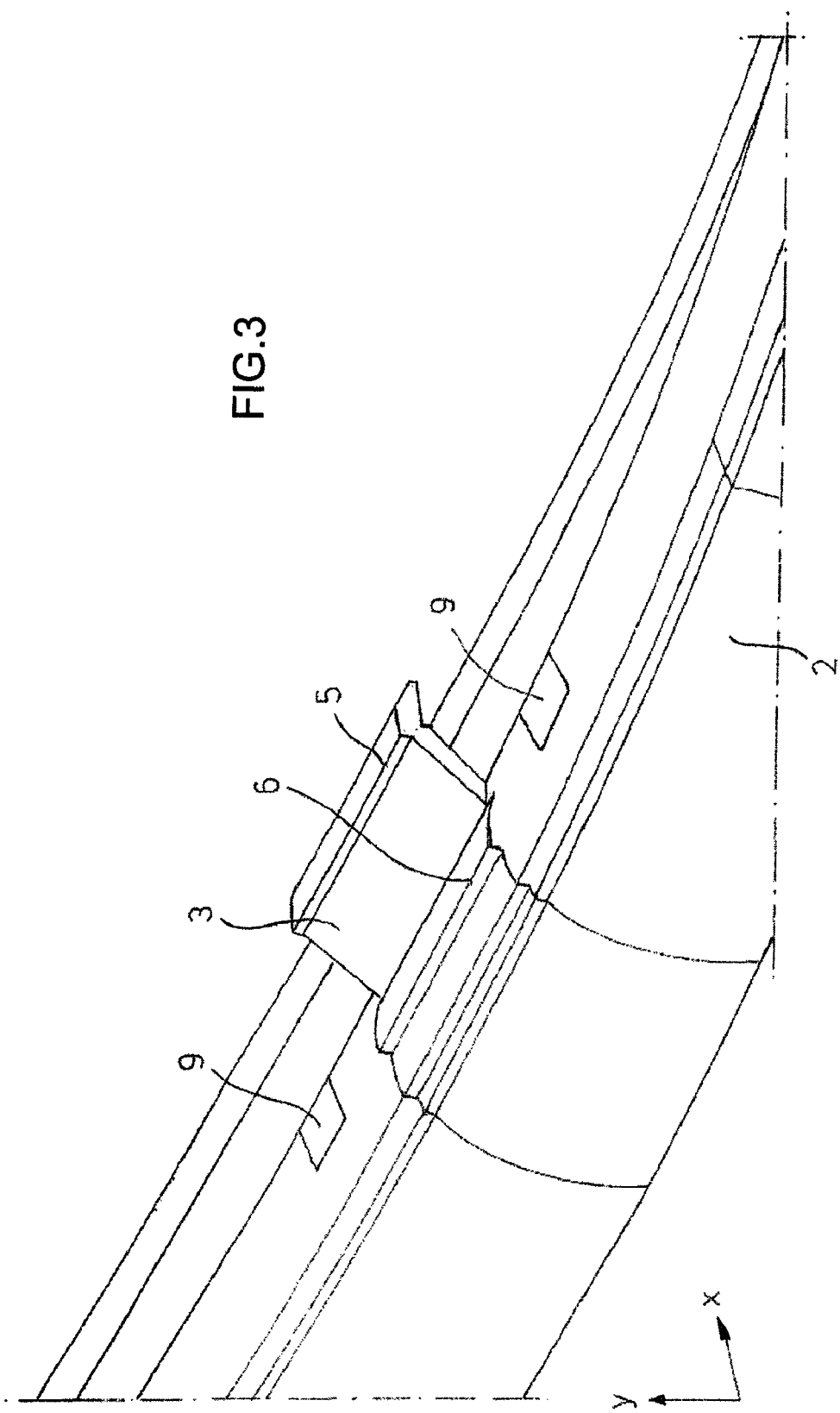
FIG. 3 is a diagrammatic, perspective view of the add-on part.

FIG. 3 shows a view of the add-on part 2 with the fastening device 3, on which the first detent step 5 and the second detent step 6 are disposed. The fastening device 3 should be adapted to the openings 4 in the vehicle cowling part 1 or vice versa, so that a locking in a temporary fixation TF and a final fixation FF can occur.

The fastening device 3 is preferably made together with the add-on part 2 in a pressing process.

The opening 4 in the vehicle cowling part 1 must enable, on the one hand, a shoving in of the fastening device 3, as well as a locking in of the two detent steps 5, 6.

Figure 4:
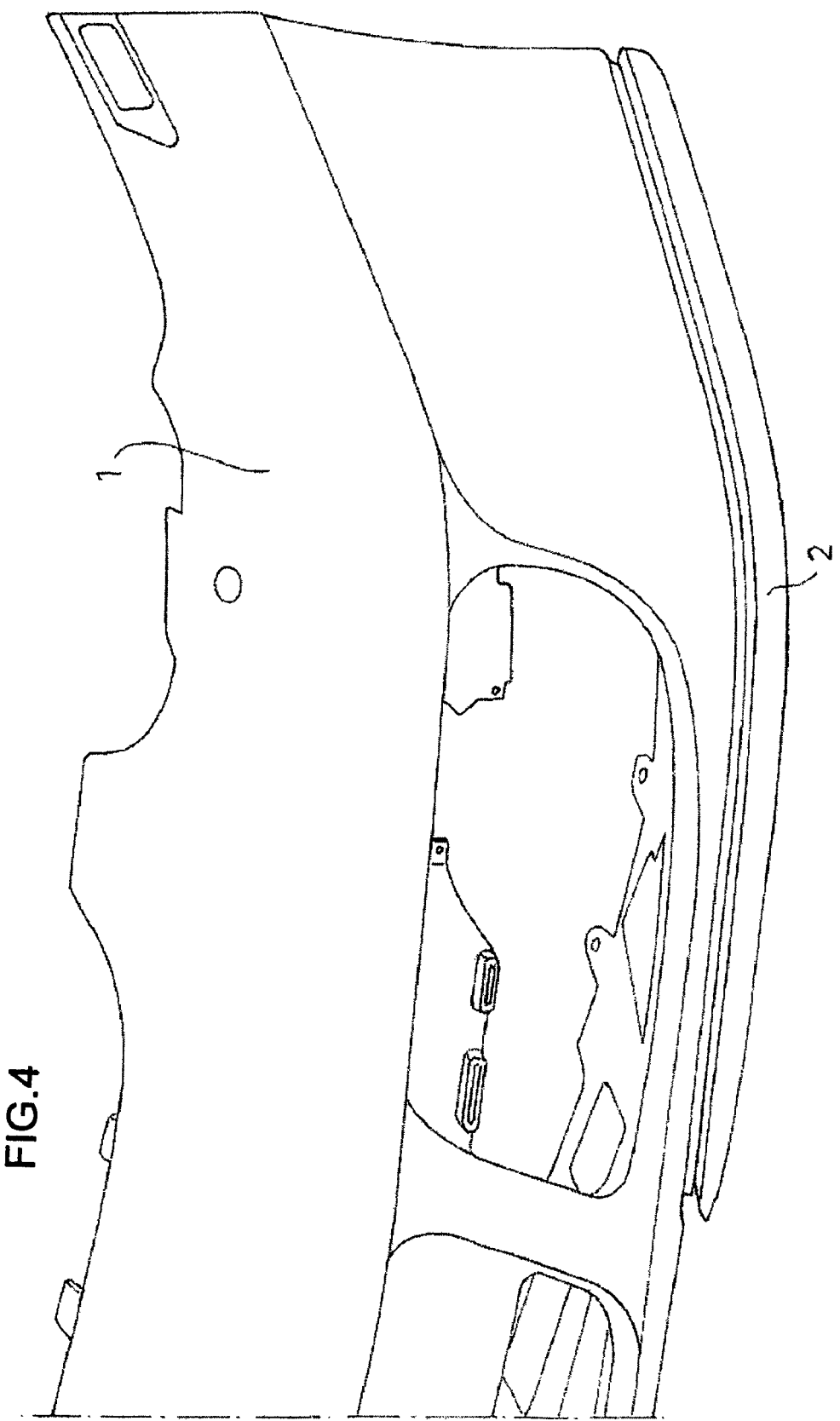
FIG. 4 is a diagrammatic, perspective view of the cowling part and the add-on part.

FIG. 4 shows a view of the vehicle cowling part 1, here, a bumper, with the add-on part 2, here, a spoiler, in the temporary fixation TF, in which the add-on part 2 is disposed at a distance from the vehicle cowling part 1.

Thanks to the temporary fixation shown in FIG. 1, the add-on part 2 is disposed at a distance D from the vehicle cowling part 1, so that during painting, the edges of the add-on part 2 will also be painted. This prevents any paint shadow.

The invention claimed is:

1. A configuration for handling a vehicle cowling part together with an add-on part, the configuration comprising:
   a fastening device defining a temporary fixation position and a final fixed position and being integrated into the add-on part thus forming a single piece with the add-on part, the parts being temporarily fixed at a distance from each other at the temporary fixation position by said fastening device engaging the vehicle cowling part and then can be handled together, and after the handling the parts are fixed onto each other in the final fixed position by said fastening device further engaging the vehicle cowling part.

2. The configuration according to claim 1, wherein:
   the vehicle cowling part has openings formed therein;
   said fastening device can snap into the openings formed in the vehicle cowling part; and
   said fastening device further having a first detent step for snapping into said temporary fixation position and a second detent step for snapping into said final fixed position.

3. The configuration according to claim 2, wherein said fastening device has ribs disposed in a region of said first detent step, with which said fastening device can slide, so that a shoving into the openings on the vehicle cowling part is facilitated and said ribs serve for a fixation in the temporary fixation position.

4. The configuration according to claim 1, wherein the vehicle cowling part and the add-on part may be painted while held in the temporary fixation position.

5. The configuration according to claim 2, wherein the vehicle cowling part is a bumper having the openings formed therein.

6. The configuration according to claim 5, wherein the add-on part is an aerodynamical structural part.

7. The configuration according to claim 6, wherein said fastening device includes matching ribs disposed at said openings of the vehicle cowling part, said matching ribs only reach under the add-on part and fix the add-on part in the final fixed position.

8. The configuration according to claim 1, wherein said final fixed position is reached in several stages.

* * * * *